(12) United States Patent
Yamaguchi et al.

(10) Patent No.: US 7,401,591 B2
(45) Date of Patent: Jul. 22, 2008

(54) CONTROL SYSTEM FOR INTERNAL COMBUSTION ENGINE

(75) Inventors: Satoshi Yamaguchi, Wako (JP); Mamoru Hasegawa, Wako (JP); Hideki Sakamoto, Wako (JP); Naoto Kitayama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 85 days.

(21) Appl. No.: 11/591,593

(22) Filed: Nov. 2, 2006

(65) Prior Publication Data

US 2007/0151542 A1   Jul. 5, 2007

(30) Foreign Application Priority Data

Dec. 2, 2005  (JP)  ............................. 2005-348555
Dec. 7, 2005  (JP)  ............................. 2005-352808

(51) Int. Cl.
*F02B 3/00*  (2006.01)
*F02M 7/00*  (2006.01)
*F02M 51/00*  (2006.01)
*G06F 17/00*  (2006.01)

(52) U.S. Cl. ...................... 123/299; 123/435; 123/478; 701/104; 701/105

(58) Field of Classification Search ................ 123/299, 123/305, 501, 27 R, 1 A, 294, 435, 478; 701/104, 701/105; 73/35.02
See application file for complete search history.

(56) References Cited

U.S. PATENT DOCUMENTS

| | | | | |
|---|---|---|---|---|
| 4,397,285 A | * | 8/1983 | O'Neill | 123/502 |
| 4,722,310 A | * | 2/1988 | Igashira et al. | 123/300 |
| 5,457,985 A | * | 10/1995 | Cellier et al. | 73/35.02 |
| 6,026,778 A | * | 2/2000 | Mille et al. | 123/198 A |
| 6,609,413 B1 | * | 8/2003 | De Craecker | 73/35.02 |
| 6,684,153 B2 | * | 1/2004 | Wada | 701/114 |
| 7,013,865 B2 | * | 3/2006 | Nagai et al. | 123/305 |
| 7,027,906 B2 | * | 4/2006 | Araki | 701/104 |
| 7,028,532 B2 | * | 4/2006 | Shinzawa | 73/35.02 |
| 7,289,900 B2 | * | 10/2007 | Wilharm et al. | 701/103 |

FOREIGN PATENT DOCUMENTS

JP   2004-340026 A   12/2004

* cited by examiner

*Primary Examiner*—Willis R. Wolfe, Jr.
*Assistant Examiner*—Johnny H. Hoang
(74) *Attorney, Agent, or Firm*—Arent Fox LLP

(57) ABSTRACT

A control system for an internal combustion engine having at least one fuel injection valve for injecting fuel into a combustion chamber of the engine and burning the injected fuel by compression ignition. A fuel injection control parameter for controlling at least one fuel injection valve is changed. A combustion state of the engine is then detected. A cetane number of the fuel is then estimated based on the changed fuel injection control parameter and the detected combustion state.

14 Claims, 6 Drawing Sheets

FIG. 7
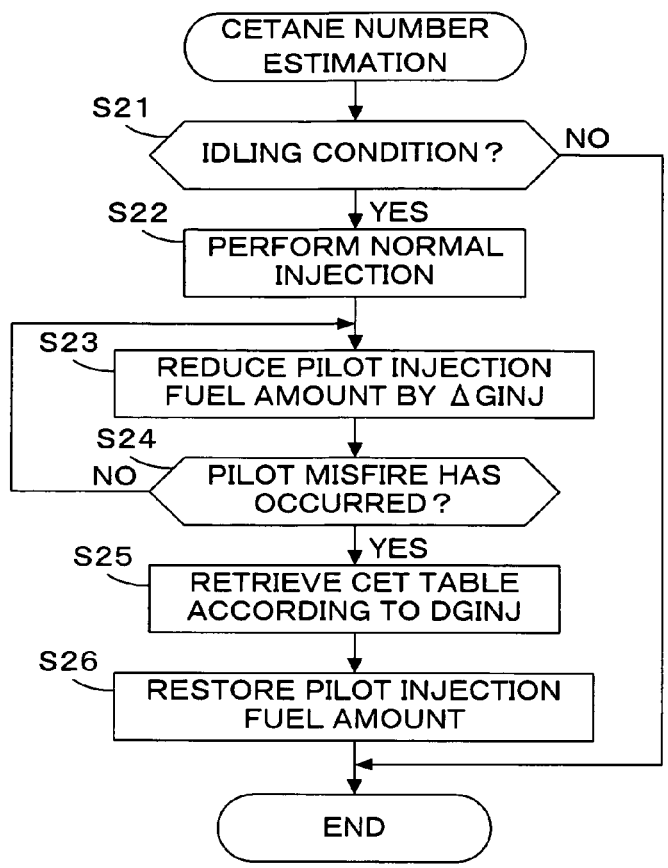
FIG. 8A  INJP
FIG. 8B  INJM
FIG. 8C  dp/dθ

CONTROL SYSTEM FOR INTERNAL COMBUSTION ENGINE

BACKGROUND OF THE INVENTION

1. Field of the Invention

The present invention relates to a control system for an internal combustion engine, which ignites fuel in a combustion chamber by compressing an air-fuel mixture, and particularly relates to a control system which estimates a cetane number of the fuel used by the internal combustion engine.

2. Description of the Related Art

Japanese Patent Laid-open No. 2004-340026 (JP '026) discloses a method of estimating a cetane number of the fuel used in the internal combustion engine which burns the fuel by compression ignition using a relatively inexpensive sensor. Specifically, the following methods are disclosed in JP '026: 1) a method which uses an exciting force sensor for detecting an exciting force of the engine; 2) a method which uses a torque sensor for detecting an output torque of the engine; 3) a method which uses a CO sensor for detecting a concentration of CO (carbon monoxide) in exhaust gases; and 4) a method for determining the cetane number based on an angular accelerating speed calculated from a change in the engine rotational speed.

Among the above-described methods disclosed in JP '026, methods 1) to 3) require special sensors which are not normally used in engine control. While method 4) determines the cetane number based on an output of the engine rotational speed sensor, it must detect the rotational speed using a very short sampling period (i.e., a period corresponding to about 2 or 3 degrees of the crank angle).

SUMMARY OF THE INVENTION

The present invention was attained in view of the above-described points, and an aspect of the invention is to provide a control system for an internal combustion engine which estimates the cetane number of the fuel being used by a relatively simple method and without using or otherwise requiring a special sensor.

To attain the above-described aspect, the invention provides a control system for an internal combustion engine having fuel injection means for injecting fuel into a combustion chamber of the internal combustion engine and burning the injected fuel by compression ignition. The control system includes fuel injection control means, combustion state detecting means, and cetane number estimating means. The fuel injection control means controls the fuel injection means. The combustion state detecting means detects a combustion condition (MF, dp/dθ) of the engine. The cetane number estimating means changes a fuel injection control parameter (CAINJ, GINJP) using the fuel injection control means and estimates a cetane number (CET) of the fuel based on a control parameter (CARTD, DGINJ) of the changed fuel injection control parameter (CAINJ, GINJP) and the combustion state (MF, dp/dθ) detected by the combustion state detecting means.

The fuel injection control parameter is changed with the above-described structural configuration, and the cetane number of the fuel in use is estimated based on the changed fuel injection control parameter and the detected combustion state of the engine. When the fuel injection control parameter, e.g., the fuel injection timing, is changed, the combustion state of the engine changes and the changing manner of the combustion state differs depending on the cetane numbers of the fuel. Accordingly, the cetane number is estimated based on the changed fuel injection control parameter and the detected combustion state. For example, the engine combustion state is detected using an output signal from a normal engine rotational speed sensor or knock sensor. Therefore, the cetane number of the fuel in use is estimated using a relatively simple method.

Preferably, the fuel injection control parameter is a fuel injection timing (CAINJ), and the cetane number estimating means estimates the cetane number based on a control parameter of the changed fuel injection timing and the detected combustion state.

The fuel injection timing is changed with the above-described structural configuration, and the cetane number of the fuel in use is estimated based on the control parameter of the changed fuel injection timing and the detected combustion state of the engine. For example, the cetane number of the fuel is estimated by gradually retarding the fuel injection timing from the normal injection timing and determining the injection timing at which a parameter indicative of combustion roughness exceeds a determination threshold value.

Preferably, the cetane number estimating means estimates the cetane number based on the control parameter of the changed fuel injection timing (CAINJ) at which a misfire has occurred.

Preferably, the cetane number estimating means changes the fuel injection timing in a predetermined premix combustion region that is previously defined according to an operating condition (NE, TRQ) of the engine.

With the above-described structural configuration, the change in the fuel injection timing is performed in the predetermined premix combustion region that is previously defined according to the operating condition of the engine. In the premix combustion region, the period from the fuel injection timing to the ignition timing is relatively long. Accordingly, a difference in the cetane number is likely to be reflected in the combustion state. Therefore, the estimation accuracy is improved by performing the cetane number estimation in the premix combustion region.

Preferably, the fuel injection control parameter is a pilot injection fuel amount. The cetane number estimating means changes the pilot injection fuel amount by the fuel injection control means when supplying fuel with a pilot injection and a main injection through the fuel injection means and estimates the cetane number based on a control parameter of the changed pilot injection fuel amount and the detected combustion state.

With the above-described structural configuration, when supplying fuel with the pilot injection and the main injection, the pilot injection fuel amount is changed, and the cetane number of the fuel in use is estimated based on the control parameter of the changed pilot injection fuel amount and the detected combustion state. When the pilot injection fuel amount is changed, the combustion state changes, and the manner of the change in the combustion state differs depending on the cetane number of the fuel. For example, the cetane number of the fuel is estimated by gradually reducing the pilot injection fuel amount from the normal amount and determining a reduced fuel amount with which a misfire has occurred.

Preferably, the cetane number estimating means estimates the cetane number based on the control parameter of the changed pilot injection fuel amount with which a misfire of the fuel injected by the pilot injection has occurred.

Preferably, the engine has a plurality of cylinders, and the cetane number estimating means performs the estimation of the cetane number with respect to a portion of the plurality of cylinders.

With the above-described structural configuration, the change in the fuel injection timing for estimating the cetane number is performed with respect to a portion of the plurality of cylinders, and normal or routine engine control is performed with respect to other cylinders, wherein any undue influence to the operating performance of the engine is reduced.

BRIEF DESCRIPTION OF THE DRAWINGS

FIG. 7 is a flowchart of a cetane number estimation process used in the second embodiment;

FIGS. 8A-8C show time charts used for explaining a method of detecting a pilot misfire;

DETAILED DESCRIPTION OF THE PREFERRED EMBODIMENTS

Preferred embodiments of the present invention will now be described with reference to the drawings.

Figure 1:
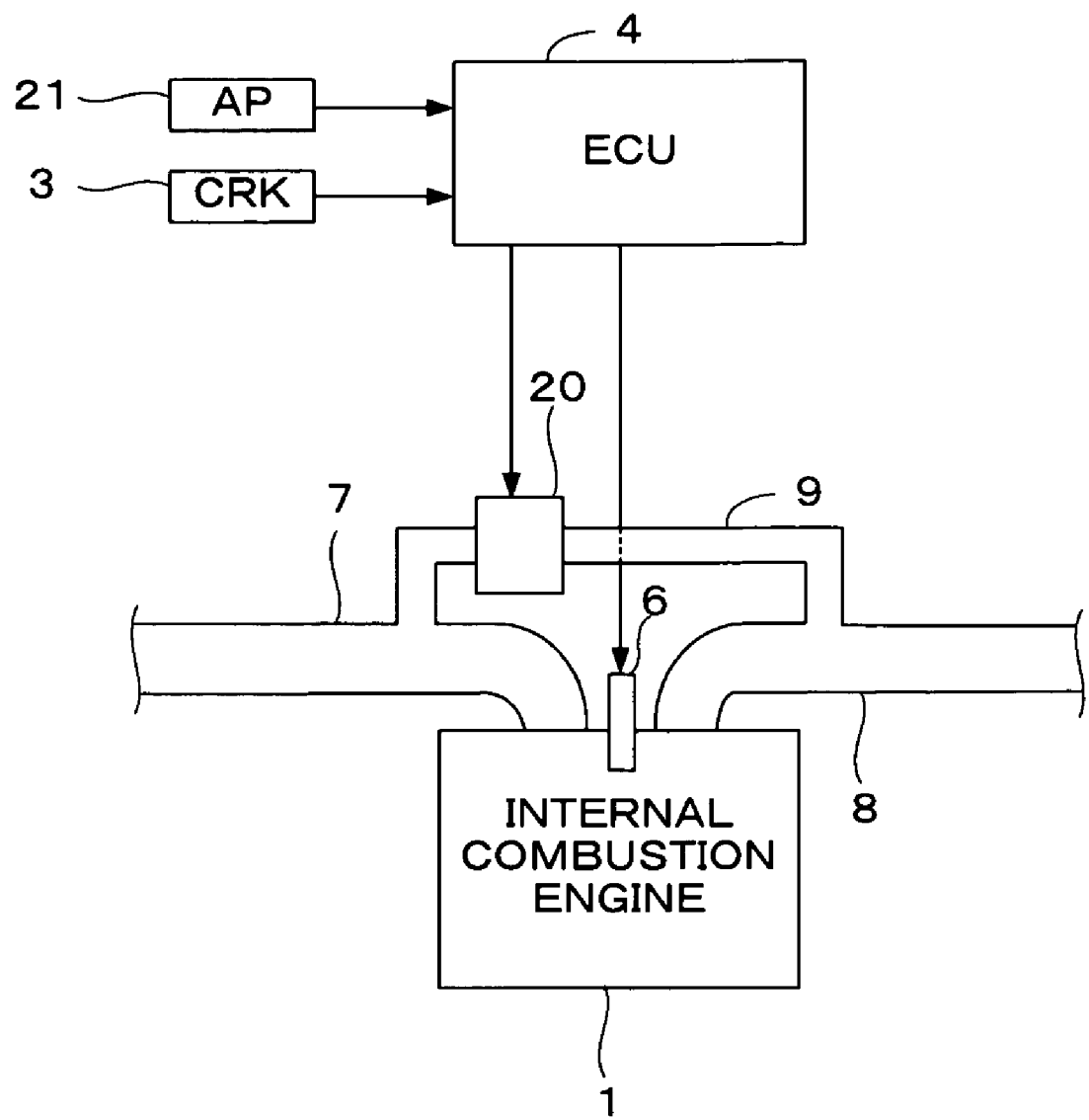
FIG. 1 is a schematic diagram illustrating an internal combustion engine and a control system therefore according to a first embodiment of the present invention.

FIG. 1 is a schematic diagram illustrating an internal combustion engine and a control system therefore according to one embodiment of the present invention. The internal combustion engine 1 (hereinafter referred to as "engine"), which has four cylinders, is a diesel engine wherein fuel is injected directly into a combustion chamber to perform compression ignition combustion. The combustion chamber of each cylinder is provided with a fuel injection valve 6 that is electrically connected to an electronic control unit 4 (hereinafter referred to as "ECU 4"). The ECU 4 controls a valve opening period and a valve opening timing of each fuel injection valve 6. That is, the fuel injection period and fuel injection timing are controlled by the ECU 4.

The engine 1 has an intake pipe 7 and an exhaust pipe 8. An exhaust gas recirculation passage 9, which recirculates a portion of exhaust gases to the intake pipe 7, is provided between the exhaust pipe 8 and the intake pipe 7. The exhaust gas recirculation passage 9 is provided with an exhaust gas recirculation control valve 10 (hereinafter referred to as "EGR valve") that controls the amount of recirculated exhaust gases. The EGR valve 10 is an electromagnetic valve having a solenoid. The valve opening of the EGR valve 10 is controlled by the ECU 4. The exhaust gas recirculation passage 9 and the EGR valve 10 define the exhaust gas recirculation mechanism.

The engine 1 is provided with a crank angle position sensor 11 for detecting a rotation angle of the crankshaft (not shown). The crank angle position sensor 11 includes a cylinder discrimination sensor, a TDC sensor, and a CRK sensor. The cylinder discrimination sensor outputs a pulse (hereinafter referred to as "CYL pulse") at a predetermined crank angle position for a specific cylinder of the engine 1. The TDC sensor outputs a TDC pulse at a crank angle position before a top dead center (TDC) of a predetermined crank angle starting at an intake stroke in each cylinder (at every 180 degrees of the crank angle in the case of a four-cylinder engine). The CRK sensor generates one pulse (hereinafter referred to as "CRK pulse") with a constant crank angle period (e.g., periods of 6 degrees) that is shorter than the period the TDC pulse is generated. The CYL pulse, the TDC pulse, and the CRK pulse are supplied to the ECU 4. The CYL, TDC and CRK pulses are used for various timing controls, such as a fuel injection timing and an ignition timing, and also detect an engine rotational speed NE.

An accelerator sensor 12 for detecting an operation amount AP of an accelerator pedal of the vehicle driven by the engine 1, an intake air flow rate sensor for detecting an intake air flow rate GA of the engine 1 (not shown), a coolant temperature sensor (not shown) for detecting a coolant temperature TW of the engine 1, an intake air temperature sensor (not shown) for detecting an intake air temperature TA of the engine 1, and the like, are connected to the ECU 4. The detection signals of the above-described sensors are supplied to the ECU 4.

The ECU 4 includes an input circuit, a central processing unit (hereinafter referred to as "CPU"), a memory circuit, and an output circuit. The input circuit performs numerous functions, including shaping the waveforms of input signals from the various sensors, correcting the voltage levels of the input signals to a predetermined level, and converting analog signal values into digital signal values. The memory circuit preliminarily stores various operating programs to be executed by the CPU and stores computation results, and the like, that are performed by the CPU. The output circuit supplies control signals to the fuel injection valve 6, and the like.

The CPU in the ECU 4 calculates the fuel injection period, the fuel injection timing, the opening of the EGR valve 10, and the like, according to the operating condition of the engine 1 detected by various sensors. The CPU also performs fuel supply control and exhaust gas recirculation control. Further, the CPU of the ECU 4 executes a process for estimating a cetane number CET of the fuel being used and performs the fuel injection control and the exhaust gas recirculation control according to the estimated cetane number CET. A demand torque TRQ is calculated according to the operation amount AP of the accelerator pedal, and various other related controls are executed according to the engine rotational speed NE and the demand torque TRQ.

Figure 2:
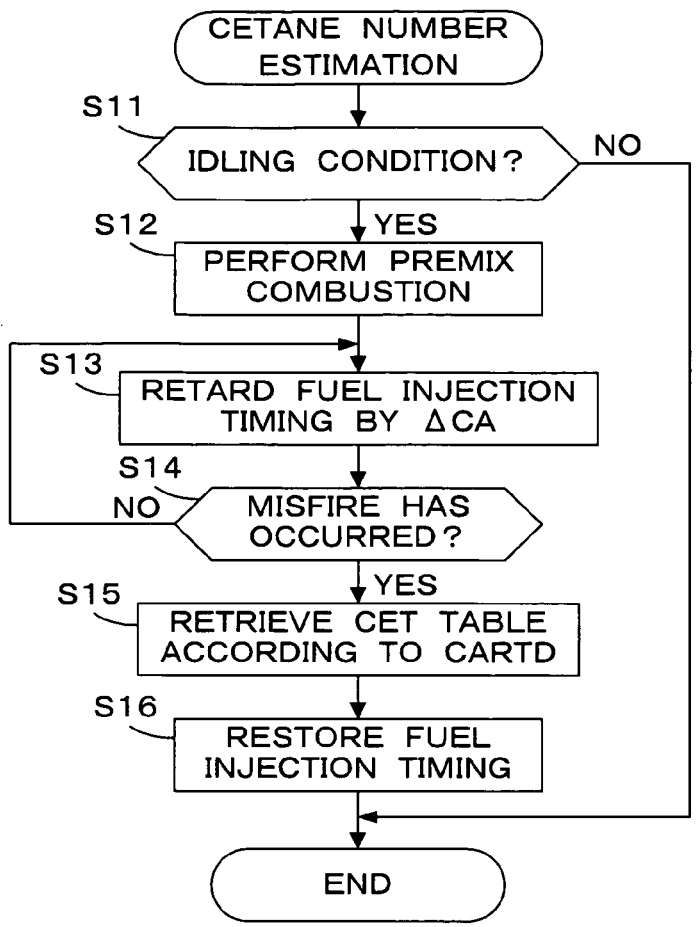
FIG. 2 is a flowchart of a cetane number estimation process.

FIG. 2 is a flowchart of the cetane number estimation process. The cetane number estimation process is executed by the CPU in the ECU 4 and is synchronized with generation of the TDC pulse.

In step S11, it is determined whether the operating condition of the engine 1 is an idling condition. If the engine 1 is not in the idling condition, the process immediately ends. If the engine is in the idling condition, a premix combustion is performed. The premix combustion is defined as a combustion in which the injected fuel burns after a delay time period has elapsed from the time of fuel injection and is performed in a predetermined premix combustion region.

Figure 4:
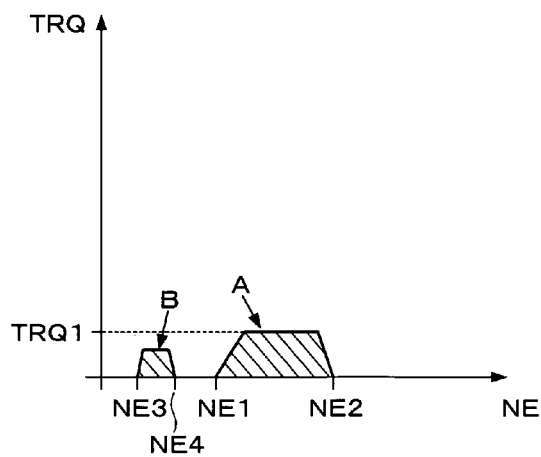
FIG. 4 shows the premix combustion regions.

For example, when the vehicle driven by the engine 1 is running, a hatched region A shown in FIG. 4, i.e., the region defined by the demand torque TRQ below a predetermined torque TRQ1 (for example, 60 Nm) and the engine rotational speed NE in the range from a first predetermined rotational speed NE1 (for example, 1200 rpm) to a second predetermined rotational speed NE2 (for example, 2300 rpm), is the premix combustion region. When the cetane number estimation is performed during the idling condition or state, the region B shown in FIG. 4, i.e., the region defined by the demand torque TRQ below the predetermined torque TRQ1 and the engine rotational speed NE in the range from a 3rd predetermined rotational speed NE3 (for example, 830 rpm) to a 4th predetermined rotational speed NE4 (for example, 850 rpm), is the premix combustion region. In the premix combustion, only the main injection is performed and pilot injection is not performed.

In the premix combustion region, a difference in the ignition timing due to a difference in the cetane number of the fuel increases a significant amount. Therefore, when the fuel injection timing CAINJ is retarded, a change in the combustion state also increases. Accordingly, estimation accuracy of the cetane number is improved.

In step S13, the fuel injection timing CAINJ is retarded by a predetermined crank angle ΔCA (for example, 0.1 degree). In step S14, it is determined whether a misfire has occurred in the engine 1. The misfire determination is performed as follows. That is, a combustion fluctuation parameter MF indicating a combustion state (combustion roughness) of the engine 1 is calculated by a known method (which is disclosed, for example, in Japanese Patent Publication No. 3626020, Japanese Patent Laid-open No. Hei 11-50902, etc.) based on the periods the CRK pulse, output from the CRK sensor, is generated. When the combustion fluctuation parameter MF exceeds a determination threshold value MFTH, it is determined that a misfire has occurred.

Figure 3:
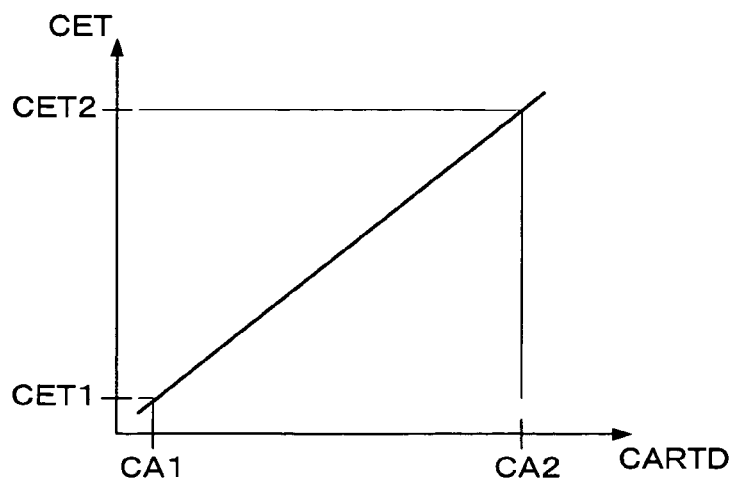
FIG. 3 shows a table used in the process of FIG. 2.

If the answer to step S14 is negative (NO), i.e., if the misfire has not occurred, the process returns to step S13 in which the fuel injection timing CAINJ is retarded by the predetermined crank angle ΔCA. Steps S13 and S14 are repeatedly executed until a misfire occurs. When a misfire occurs, the process proceeds to step S15, wherein a CET table shown in FIG. 3 is retrieved according to a total retard amount CARTD (=ΔCA× NRTD, NRTD is a number of times of execution of step S13) to calculate the estimated cetane number CET. If the cetane number CET is high and the combustion state is not likely to become unstable, the total retard amount CARTD is great, while if the cetane number CET is low and the combustion state is likely to become unstable, the total retard amount CARTD is small. Therefore, the CET table is set so that the cetane number CET increases as the total retard amount CARTD increases. In FIG. 3, the retard amounts CA1 and CA2 are respectively set, for example, to 5 degrees and 10 degrees, and the corresponding cetane numbers CET1 and CET2 are set respectively to "42" and "57".

In step S16, the fuel injection timing CAINJ is restored to the initial value and the process ends.

Figure 5A:
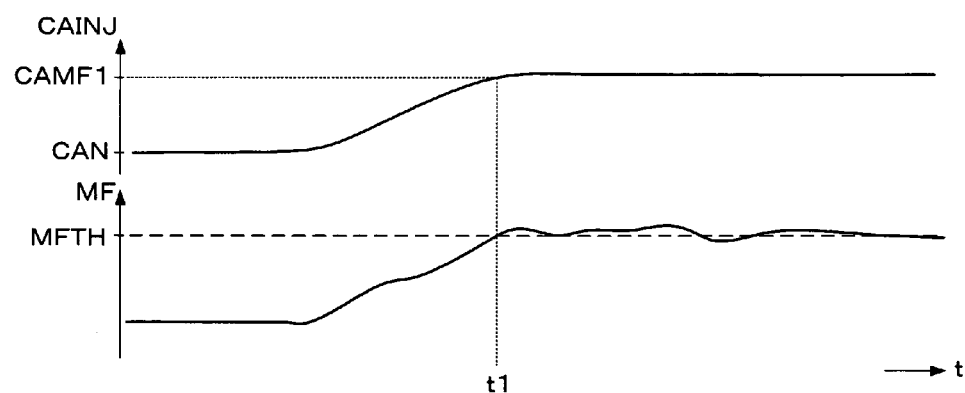
FIGS. 5A and 5B show time charts for illustrating changes in the fuel injection timing (CAINJ) and the combustion fluctuation parameter (MF) when executing the process of FIG. 2.
Figure 5B:
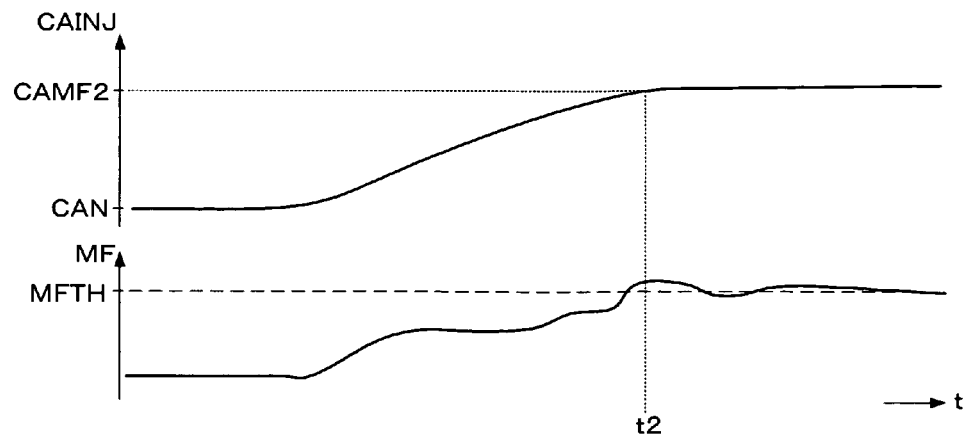

FIG. 5 shows changes in the fuel injection timing CAINJ and the combustion fluctuation parameter MF during execution of the cetane number determination process of FIG. 2. FIG. 5(a) corresponds to a case where the fuel in use is a fuel having a low cetane number (for example, 41), and FIG. 5(b) corresponds to a case where the fuel in use has a high cetane number (for example, 57). The parameter CAN shown in FIG. 5 indicates a normal fuel injection timing, which is, for example, about 20 degrees before TDC. In the case of the low cetane number fuel shown in FIG. 5(a), the combustion fluctuation parameter MF exceeds the misfire determination threshold value MFTH at time t1. A fuel injection timing CAMF1 is about 15 degrees before TDC at time t1. That is, the total retard amount CARTD is about 5 degrees.

On the other hand, in the case of the high cetane number fuel shown in FIG. 5(b), the combustion fluctuation parameter MF exceeds the misfire determination threshold value MFTH at time t2. A fuel injection timing CAMF2 is about 10 degrees before TDC at time t2. That is, the total retard amount CARTD is about 10 degrees.

Therefore, the cetane number CET of the fuel in use is accurately estimated according to the total retard amount CARTD.

In the present embodiment, the combustion fluctuation parameter MF is calculated while only using a normal crank angle position sensor. Accordingly, the cetane number of the fuel being used is estimated using a relatively simple method and without using or otherwise requiring a special sensor.

In the present embodiment, the crank angle position sensor 11 and the ECU 4 define the combustion state detecting means, and the ECU 4 defines the fuel injection control means and the cetane number estimating means. Specifically, steps S12 and S16 of FIG. 2 correspond to the fuel injection control means, and steps S13 to S15 correspond to the cetane number estimating means.

The present invention is not limited to the embodiment described above, and various modifications may be made. For example, in the above-described embodiment, the cetane number CET is estimated according to the total retard amount CARTD at the time a misfire occurs. Alternatively, the cetane number CET may be estimated according to a retard amount of the fuel injection timing when the combustion state detected by the combustion fluctuation parameter MF becomes worse than a predetermination state, using a determination threshold value which is smaller than the misfire determination threshold value MFTH. That is, the cetane number may be estimated according to the retard amount of the fuel injection timing at which the combustion fluctuation parameter MF exceeds the smaller or lower determination threshold value.

Further, when the cetane number estimation process is executed, the intake air flow rate may be decreased by the throttle valve (not shown) and/or the recirculation amount of exhaust gases may be increased to more easily detect the difference in the combustion state due to the difference in the cetane number.

Further, in the above-described embodiment, the cetane number estimation process is performed when the premix combustion is performed in the idling condition of the engine 1. Alternatively, the cetane number estimation process may be performed when the engine operating condition is in the premix combustion region A shown in FIG. 4.

The cetane number estimation process may be performed with respect to only a portion of the cylinders of the engine 1, and the normal combustion may be continued in the other cylinders. In this case, the process shown in FIG. 2 is executed only with respect to a portion of the cylinders which is subjected to the cetane number estimation process.

According to a second embodiment of the present invention, the fuel injection is performed by the pilot injection and the main injection, and the cetane number is estimated based on the combustion state of the engine when changing an amount of the fuel injected by the pilot injection.

Therefore, in the second embodiment, the basic configuration of an internal combustion engine and a control system is the same as that of the first embodiment (FIG. 1).

Figure 6:
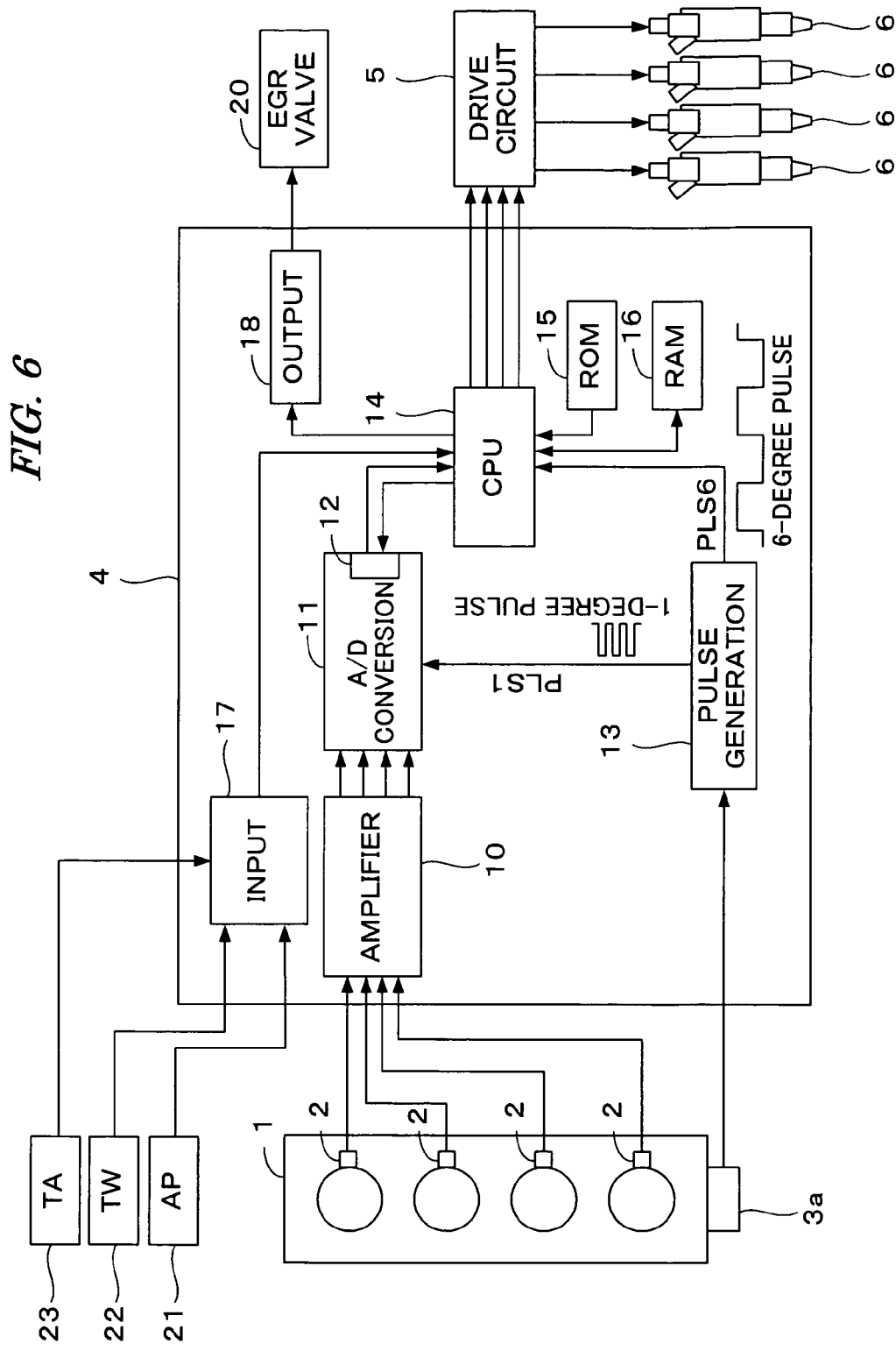
FIG. 6 is a block diagram illustrating an internal combustion engine and a control system therefore according to a second embodiment of the present invention.

FIG. 6 more specifically shows the configuration of the engine and the control system in the second embodiment.

Each cylinder of the engine 1 is provided with a cylinder pressure sensor 2 for detecting a cylinder pressure (a pressure in the combustion chamber of the engine 1). In this embodiment, the cylinder pressure sensor 2 is configured in one body together with the glow plug disposed in each cylinder. The detection signal of the cylinder pressure sensor 2 is supplied to the ECU 4. It is to be noted that the detection signal of the cylinder pressure sensor 2 corresponds to a differential signal of the cylinder pressure PCYL with respect to the crank angle (time), wherein the cylinder pressure PCYL is obtained by integrating the output of the cylinder pressure sensor.

The engine 1 is provided with a crank angle position sensor 3a for detecting a rotational angle of the crankshaft (not shown) of the engine 1. The crank angle position sensor 3a generates one pulse at every 1 degree of the crank angle, and the pulse is supplied to the ECU 4. The crank angle position sensor 3a further generates a cylinder discrimination pulse at a predetermined crank angle for a specific cylinder of the engine 1, and supplies the cylinder discrimination pulse to the ECU 4.

An accelerator sensor 21 for detecting an operation amount AP of the accelerator pedal of the vehicle driven by the engine 1, a coolant temperature sensor 22 for detecting a coolant temperature TW of the engine 1, and an intake air temperature sensor 23 for detecting an intake air temperature TA of the engine 1 are connected to the ECU 4. The detection signals of the above-described sensors are supplied to the ECU 4.

The ECU 4 provides a control signal of the fuel injection valve 6 provided in the combustion chamber of each cylinder of the engine 1 to a drive circuit 5. The drive circuit 5 is connected to the fuel injection valves 6 and supplies the driving signals according to the control signal from the ECU 4 to the fuel injection valves 6. Fuel is then injected to the combustion chamber of each cylinder at a fuel injection timing according to a control signal output from the ECU 4. The fuel injection amount is controlled to a value according to the control signal output from the ECU 4.

The ECU 4 includes an amplifier 10, an A/D conversion block 11, a pulse generation block 13, a CPU 14 (Central Processing Unit), a ROM 15 (Read Only Memory) for storing programs executed by the CPU 14, a RAM 16 (Random Access Memory) for storing calculation results, and the like, an input circuit 17, and an output circuit 18. The detection signal of the cylinder pressure sensor 2 is input to the amplifier 10. The amplifier 10 amplifies the input signal. The signal amplified by the amplifier 10 is input to the A/D conversion block 11. The pulse signal output from the crank angle position sensor 3a is input to the pulse generation block 13.

The A/D conversion block 11, which includes a buffer 12, converts the cylinder pressure sensor output from the amplifier 10 to a digital value $dp/d\theta$ (hereinafter referred to as "pressure change rate") and stores the converted digital value in the buffer 12. Specifically, a pulse signal PLS1 (hereinafter referred to as "one-degree pulse") having a crank angle period of one degree is supplied to the A/D conversion block 11 from the pulse generation block 13, the cylinder pressure sensor output is sampled at intervals of the one-degree pulse PLS1 to be converted to a digital value, and the digital value is stored in the buffer 12.

A pulse signal PLS6 output from the pulse generation block 13 and having a crank angle period of six degrees is supplied to the CPU 14. The CPU 14 performs a process for reading the digital value stored in the buffer 12 at intervals of the six-degree pulse PLS6. That is, in the present embodiment, the A/D conversion block 11 does not request an interrupt to the CPU 14, but rather, the CPU 14 performs the reading process at intervals of the six-degree pulse PLS6.

The input circuit 17 converts the detection signals of various sensors to digital values and supplies the digital values to the CPU 14. An engine rotational speed NE is calculated from the time period of the six-degree pulse PLS6. A demand torque TRQ of the engine 1 is calculated according to the operation amount AP of the accelerator pedal.

The CPU 14 calculates a pilot injection fuel amount GINJP and a main injection fuel amount GINJM according to the engine rotational speed NE and the demand torque TRQ. The CPU 14 then outputs control signals according to the calculated pilot injection fuel amount GINJP and the calculated main injection fuel amount GINJM to the drive circuit 5.

Further, the CPU 14 calculates a target exhaust gas recirculation amount according to the engine rotational speed NE and the demand torque TRQ. The CPU 14 supplies a duty control signal for controlling an opening of the EGR valve 20 according to the target exhaust gas recirculation amount to the EGR valve 20 through the output circuit 18.

The CPU 14 estimates the cetane number CET of the fuel in use with the process shown in FIG. 7 and performs a fuel injection control according to the estimated cetane number CET. The process of FIG. 7 is executed at intervals of 180 degrees of the crank angle in this embodiment, i.e., for the 4-cycle and 4-cylinder engine.

In step S21, it is determined whether the operating condition of the engine 1 is an idling condition. If the engine 1 is not in the idling condition, the process immediately ends. If the engine 1 is in the idling condition, the normal injection control is performed, i.e., the pilot injection and the main injection are executed (step S22).

In step S23, the pilot injection fuel amount GINJP is reduced by a predetermined amount $\Delta$GINJ (for example, 0.1 mg), and it is determined whether a pilot misfire has occurred in the engine 1 (step S24). Pilot misfire is defined as a misfire wherein the fuel injected by the pilot injection does not ignite. Pilot misfire is determined based on the pressure change rate $dp/d\theta$ output from the cylinder pressure sensor 2.

FIGS. 8A-8C are time charts indicating a relationship between a pilot injection pulse INJP and a main injection pulse INJM that are supplied to the fuel injection valve 6 and the pressure change rate $dp/d\theta$. FIGS. 8A-8C show an example wherein the fuel injected by the pilot injection and the main injection normally burn. A waveform of the pressure change rate $dp/d\theta$ shown in FIG. 8C is obtained by performing a band pass filtering on the cylinder pressure sensor output. In the present embodiment, when the pressure change rate $dp/d\theta$ corresponding to the combustion of the fuel injected by the pilot injection does not exceed a determination threshold value DPP, it is determined that pilot misfire has occurred. A hatched region of the pilot injection pulse INJP shown in FIG. 8A indicates the injection amount to be reduced. That is, the pilot injection fuel amount GINJP is reduced by advancing the end timing of the fuel injection without changing the fuel injection start timing CAIP.

Figure 9:
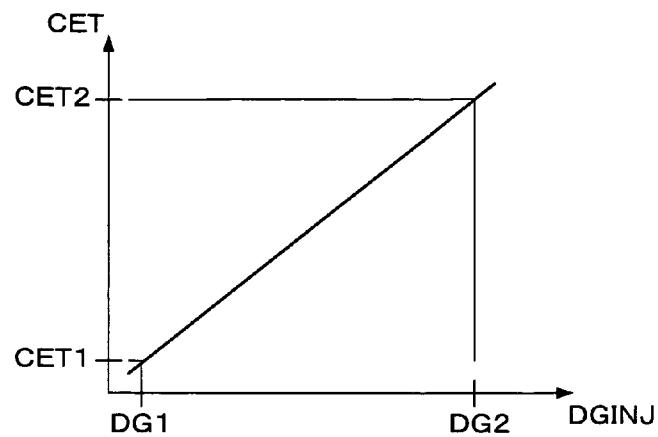
FIG. 9 shows a table used in the process of FIG. 7.

When the answer to step S24 is negative (NO), i.e., when a misfire has not occurred, the process returns to step S23, wherein the pilot injection fuel amount GINJP is reduced by the predetermined amount $\Delta$GINJ. When steps S23 and S24 are repeatedly executed and the pilot misfire occurs, the process proceeds to step S25, wherein a CET table shown in FIG. 9 is retrieved according to a total reduced amount of the pilot injection (hereinafter referred to as "total reduced amount value") DGINJ (=$\Delta$GINJ$\times$NRED, NRED is a number of times of executions of step S23) to calculate an estimated cetane number CET. If the cetane number CET is high and the combustion state is not likely to become unstable, the total reduced amount DGINJ is great, while if the cetane number CET is low and the combustion state is likely to become unstable, the total reduced amount DGINJ is small. Accordingly, the CET table is set so that the cetane number CET increases as the total reduced amount value DGINJ increases.

In FIG. 9, the reduced amount values DG1 and DG2 are set, for example, to 5 mg and 10 mg, respectively, and the corresponding cetane numbers CET1 and CET2 are set respectively to "42" and "57".

In step S26, the pilot injection fuel amount GINJP is restored to the initial value and the process ends.

Figure 10A:
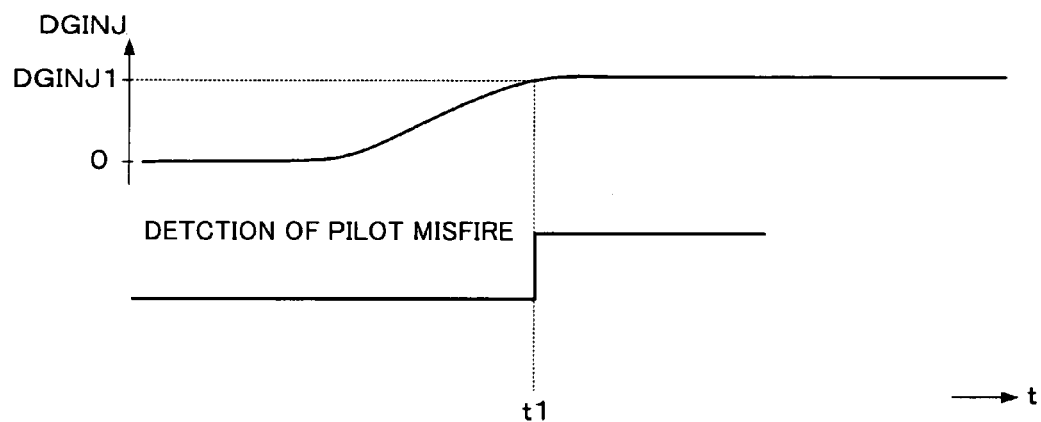
FIGS. 10A and 10B show time charts illustrating changes in the total reduced amount value (DGINJ) of the pilot injection amount when executing the process of FIG. 7 and detection timings of a pilot misfire.
Figure 10B:
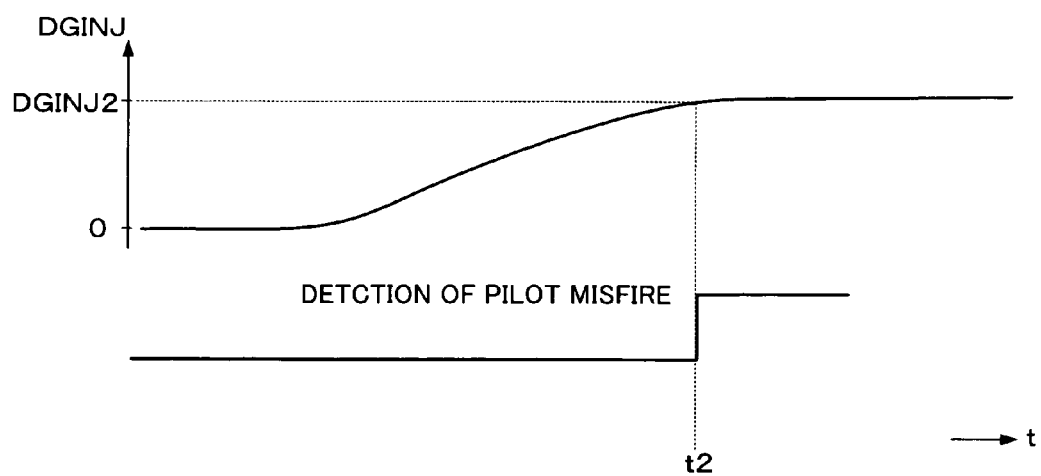

FIGS. 10A and 10B show the relationship between changes in the total reduced amount value DGINJ during execution of the cetane number determination process of FIG. 7 and a timing of the pilot misfire determination. FIG. 10A corresponds to a case where the fuel being used is a fuel of a low cetane number (for example, 41), and FIG. 10B corresponds to a case where the fuel being used is a fuel of a high cetane number (for example, 57). In the case of the low cetane number fuel shown in FIG. 10A, the pilot misfire occurs at time t1, and the total reduced amount value DGINJ1 at time t1 is about 5 mg.

On the other hand, in the case of the high cetane number fuel shown in FIG. 10B, the pilot misfire occurs at time t2, and the total reduced amount value DGINJ2 at time t2 is about 10 mg.

Therefore, according to the total reduced amount value DGINJ, the cetane number CET of the fuel being used is accurately estimated.

The CPU 14 performs the fuel injection control so that the pilot injection timing CAIP and the main injection timing CAIM are advanced and the pilot injection fuel amount GINJP is increased as the estimated cetane number CET decreases.

As described above, in the present embodiment, the pilot injection fuel amount GINJP is gradually reduced from the normal injection amount in the idling condition where the fuel is supplied by the pilot injection and the main injection. The cetane number CET of the fuel being used is estimated based on the total reduced amount DGINJ when the pilot misfire occurs, and the fuel injection control is performed according to the estimated cetane number CET. Therefore, the fuel injection suitable for the fuel being used is performed to prevent deterioration of the combustion state or increase in the combustion noise.

In the present embodiment, the cylinder pressure sensor 2 and the ECU 4 define the combustion state detecting means, and the ECU 4 defines the fuel injection control means and the cetane number estimating means. Specifically, steps S22 and S26 of FIG. 6 correspond to the fuel injection control means, and steps S23 to S25 correspond to the cetane number estimating means.

In the above-described second embodiment, pilot misfire is determined based on the pressure change rate dp/dθ detected by the cylinder pressure sensor. Alternatively, pilot misfire may be determined based on an ion current detected by an ion sensor as shown in Japanese Patent Laid-open No. 2004-150335. Alternatively, the pilot misfire may be determined by a knock sensor for detecting a knocking. The knock sensor may often be used in the control system of the internal combustion engine. Therefore, when the knock sensor is used for detecting the pilot misfire, the cetane number of the fuel is easily estimated without requiring a special sensor.

Further, the cetane number estimation process may be performed with respect to only a portion of the cylinders of the engine 1, and the normal combustion may be continued in other cylinders. In this case, the cylinder pressure sensor 2 is mounted only on one or more cylinders which are subjected to the cetane number estimation process, and the process shown in FIG. 7 is only executed with respect to the cylinders which are subjected to the cetane number estimation process.

The present invention can be applied to a cetane number estimation of fuel used in a watercraft propulsion engine such as an outboard engine having a vertically extending crankshaft.

The present invention may be embodied in other specific forms without departing from the spirit or essential characteristics thereof. The presently disclosed embodiments are therefore to be considered in all respects illustrative and not restrictive, the scope of the invention being indicated by the appended claims, rather than the foregoing description, and all changes which come within the meaning and range of equivalency of the claims are, therefore, to be embraced therein.

What is claimed is:

1. A control system for an internal combustion engine having fuel injection means for injecting fuel into a combustion chamber of said engine and burning the injected fuel by compression ignition, said control system comprising:
   fuel injection control means for controlling said fuel injection means;
   combustion state detecting means for detecting a combustion state of said engine; and
   cetane number estimating means for changing a fuel injection control parameter set by said fuel injection control means and estimating a cetane number of the fuel based on said changed fuel injection control parameter and the combustion state detected by said combustion state detecting means.

2. The control system according to claim 1, wherein said fuel injection control parameter is a fuel injection timing, and said cetane number estimating means estimates said cetane number based on a control parameter of said changed fuel injection timing and said detected combustion state.

3. The control system according to claim 2, wherein said cetane number estimating means estimates said cetane number based on said control parameter of said changed fuel injection timing at which a misfire has occurred.

4. The control system according to claim 2, wherein said cetane number estimating means changes said fuel injection timing in a predetermined premix combustion region, wherein said predetermined premix combustion region is previously defined according to an operating condition of said engine.

5. The control system according to claim 1, wherein said fuel injection control parameter is a pilot injection fuel amount, and said cetane number estimating means changes an amount of pilot injection fuel injected by said fuel injection control means when supplying fuel with a pilot injection and a main injection through said fuel injection means and estimates said cetane number based on a control parameter of said amount of changed pilot injection fuel and the detected combustion state.

6. The control system according to claim 5, wherein said cetane number estimating means estimates said cetane number based on said control parameter of said changed pilot injection fuel amount with which a misfire of said fuel injected by said pilot injection has occurred.

7. The control system according to claim 1, wherein said engine has a plurality of cylinders, and said cetane number estimating means performs estimation of said cetane number with respect to a portion of said plurality of cylinders in said engine.

8. A control method for an internal combustion engine having at least one fuel injection valve for injecting fuel into a combustion chamber of said engine and burning the injected fuel by compression ignition, said control method comprising the steps of:

a) changing a fuel injection control parameter for controlling said at least one fuel injection valve;
b) detecting a combustion state of said engine; and
c) estimating a cetane number of the fuel based on said changed fuel injection control parameter and said detected combustion state.

9. The control method according to claim 8, wherein said fuel injection control parameter is a fuel injection timing, and said cetane number is estimated based on a control parameter of said changed fuel injection timing and said detected combustion state.

10. The control method according to claim 9, wherein said cetane number is estimated based on said control parameter of said changed fuel injection timing at which a misfire has occurred.

11. The control method according to claim 9, wherein said fuel injection timing is changed in a predetermined premix combustion region, wherein said predetermined premix combustion region is previously defined according to an operating condition of said engine.

12. The control method according to claim 8, wherein said fuel injection control parameter is a pilot injection fuel amount, and said pilot injection fuel amount is changed when supplying fuel with a pilot injection and a main injection through said at least one fuel injection valve and said cetane number is estimated based on a control parameter of said changed pilot injection fuel amount and said detected combustion state.

13. The control method according to claim 12, wherein said cetane number is estimated based on said control parameter of said changed pilot injection fuel amount with which a misfire of said fuel injected by said pilot injection has occurred.

14. The control method according to claim 8, wherein said engine has a plurality of cylinders, and estimation of said cetane number is performed with respect to a portion of said plurality of cylinders in said engine.

* * * * *